Feb. 14, 1956 F. L. BRYANT 2,734,502
CENTRIFUGAL LIQUEFIER FOR FROZEN AND SOLID PRODUCTS
Filed Oct. 18, 1950 4 Sheets-Sheet 1
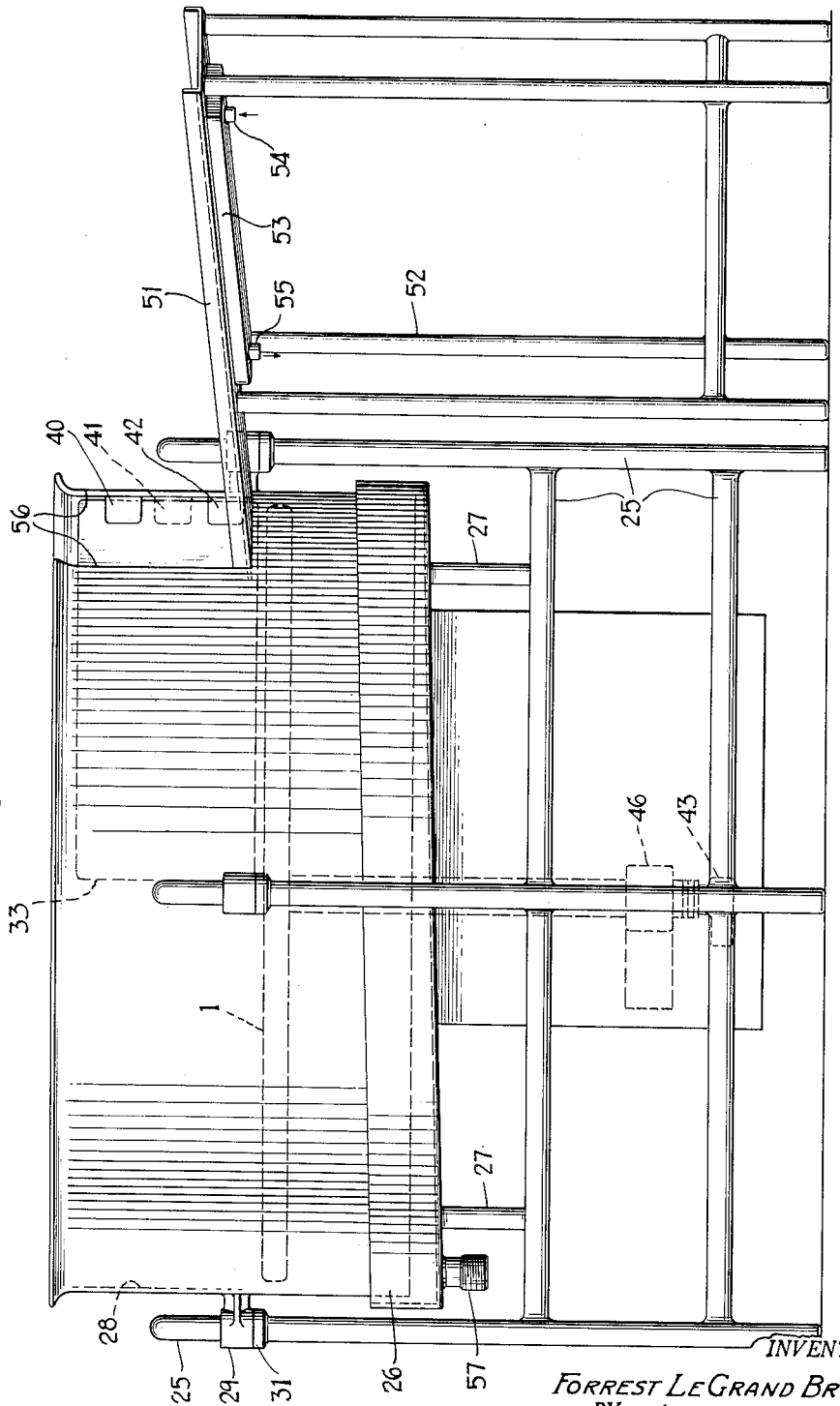
INVENTOR.
FORREST LE GRAND BRYANT.
BY
his ATTORNEYS.

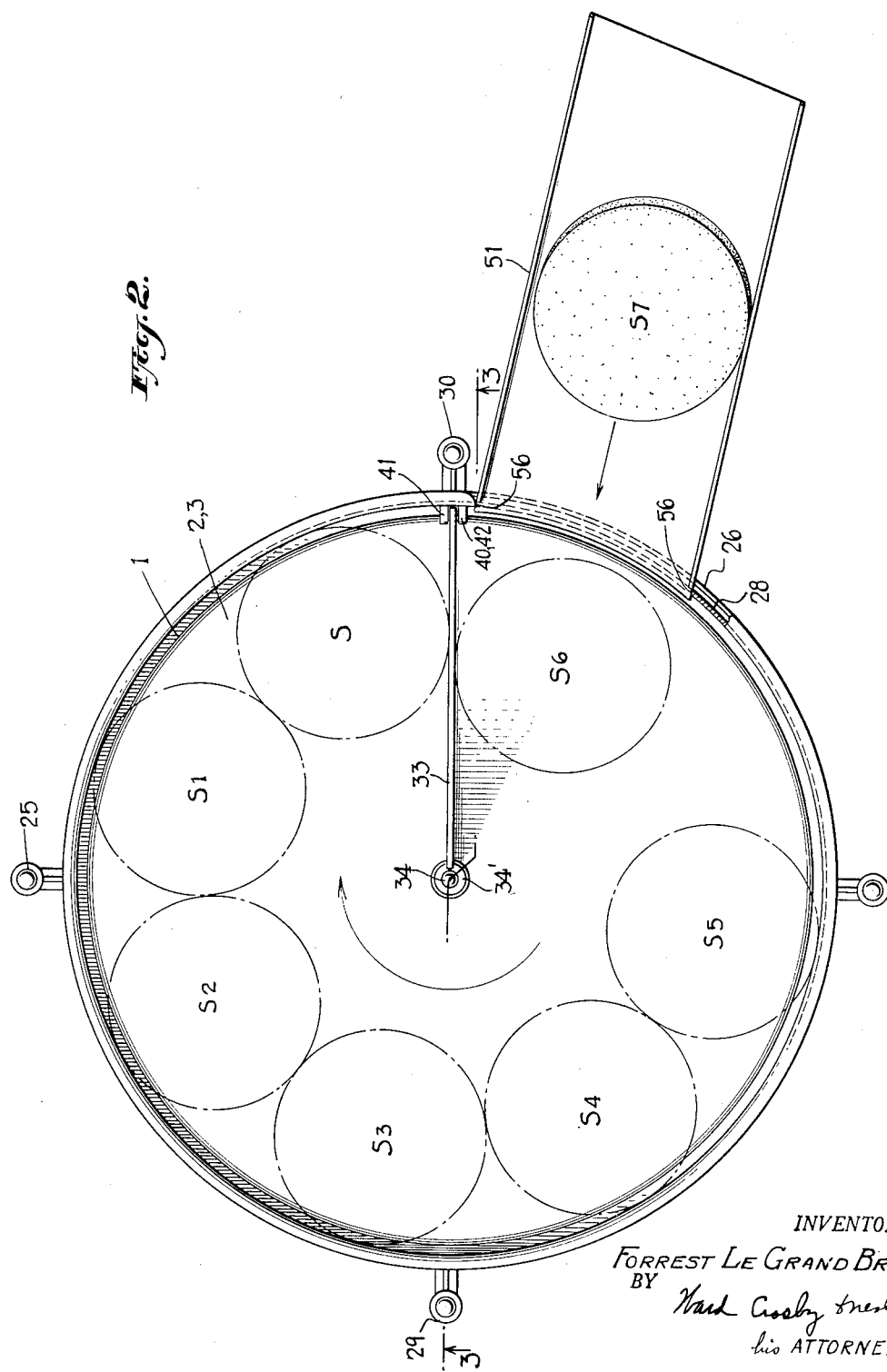

Feb. 14, 1956            F. L. BRYANT            2,734,502
CENTRIFUGAL LIQUEFIER FOR FROZEN AND SOLID PRODUCTS
Filed Oct. 18, 1950            4 Sheets-Sheet 3
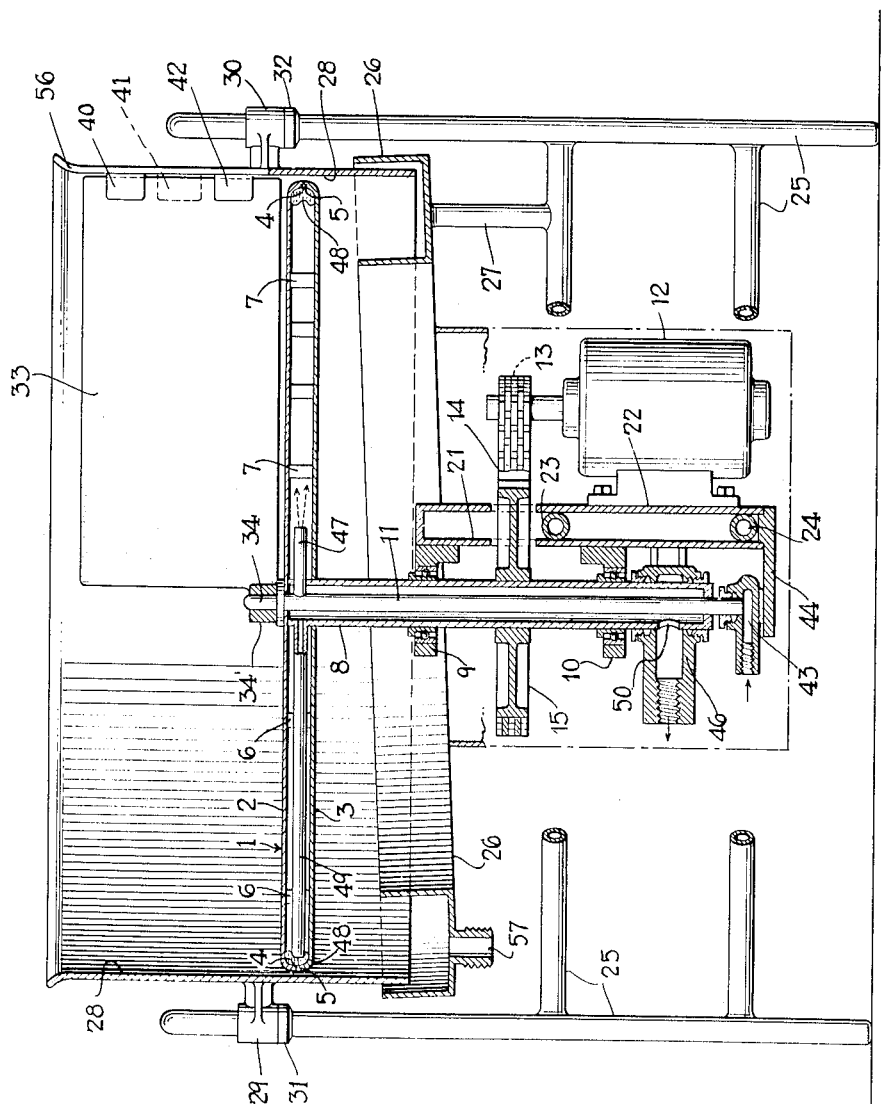
INVENTOR.
FORREST LE GRAND BRYANT.
BY
his ATTORNEYS.

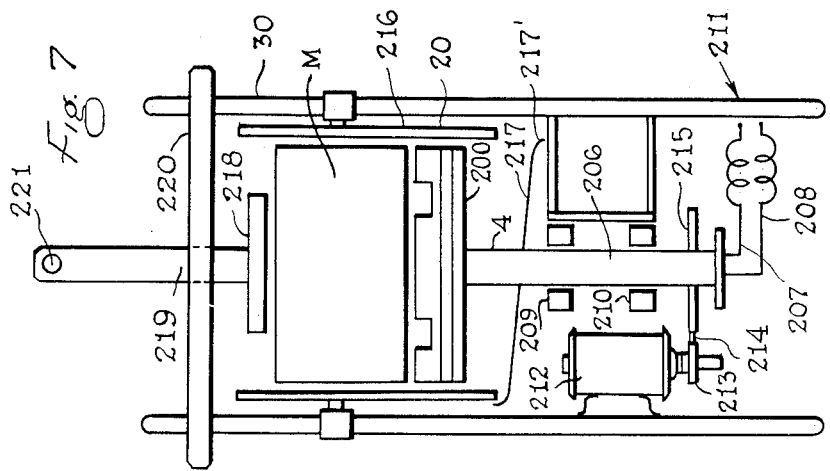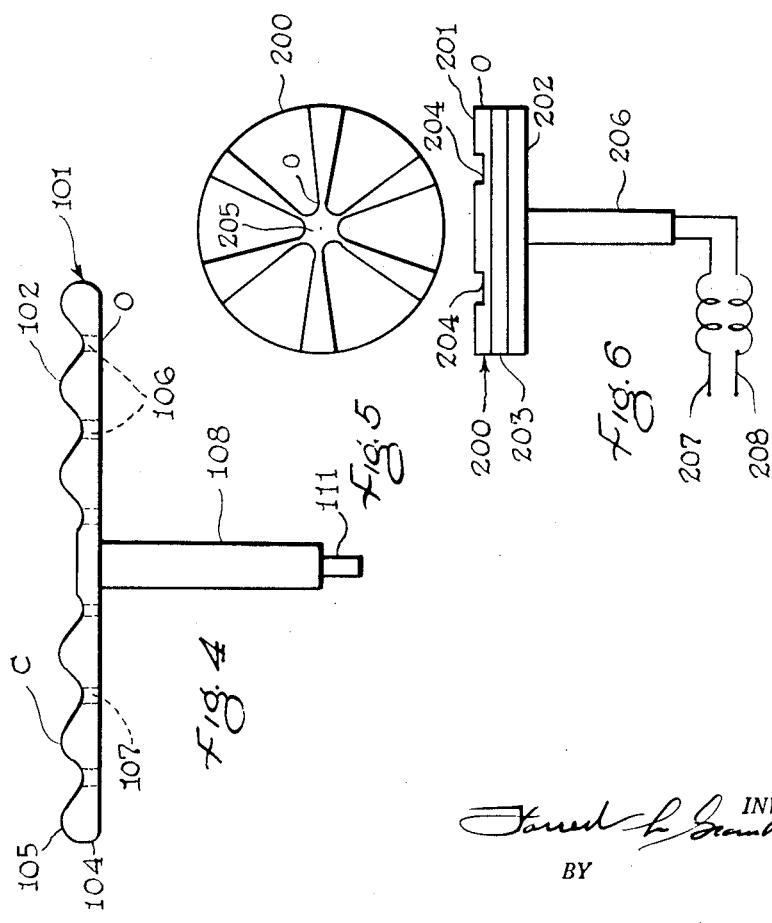

United States Patent Office 2,734,502
Patented Feb. 14, 1956

2,734,502

CENTRIFUGAL LIQUEFIER FOR FROZEN AND SOLID PRODUCTS

Forrest Le Grand Bryant, East Orange, N. J., assignor to Bryant Machinery Corporation, Jersey City, N. J., a corporation of New Jersey Application October 18, 1950, Serial No. 190,720

12 Claims. (Cl. 126—343.5)

This invention pertains to the art of liquefying or melting solid pieces of material so that these materials may be subsequently handled with greater facility, combined with other materials more readily and require the addition of less heat in the subsequent processing.

In the manufacture of ice cream mix, sour cream and other products, frozen cream, butter and frozen eggs are often used. If these materials are added in solid form to the pasteurizers in which the mix is prepared, damage to the agitating equipment often takes place. The fat in the case of cream or butter, tends to "oil off" due to being exposed to heat for such a long time during the melting process or due to being exposed to a temperature above the "oiling off temperature" during melting.

This invention provides for adding the latent heat of fusion to these materials and thus reducing them to a liquid state. The temperature of the melted material may be brought to a point nearer to the final temperature to be reached, and thus it is unnecessary to add the latent heat and part of the sensible heat in subsequent processing.

A purpose of this invention is to do this in such a manner that advantage may be taken of high temperature difference between the material being liquefied and the heating medium, the high heat content of condensing steam and the high K value (i. e., the proportionality constant or coefficient of heat conductivity) provided by velocity between the heating means and the material being liquefied.

Advantage is taken of the fact that the condensate from steam condensing on a rapidly revolving surface is thrown centrifugally from this surface and the product melted is also thrown from the surface centrifugally enhancing heat transfer. This centrifugal effect also causes the liquefied product to leave the heating surface rapidly so as not to overheat.

Advantage is also taken of the fact that when there is high velocity between the heating surface and the material being heated "burn on" is greatly reduced.

Another object is the provision of a means and method which requires very little labor in the handling of these products. A most important advantage of liquefying these products is that they may be conveyed by pipe line to any desired point.

Further objects of the invention will more fully appear from the following description taken in connection with the accompanying drawings illustrating by way of example the preferred embodiment of the apparatus used in carrying out the method.

The invention consists in the method herein described and in the novel features, arrangement, construction and combination of parts of the apparatus and means hereinafter described in accordance with certain preferred embodiments thereof, and the invention will be more particularly pointed out in the appended claims.

Referring to the accompanying drawings, in which the same reference characters indicate the same parts in the various views:

Fig. 1 is a side elevational view of an embodiment of the apparatus of my invention showing the liquefier and loading trough therefor;

Fig. 2 is a top plan view of the apparatus shown in Fig. 1 and showing pieces or units of frozen cream in position to be operated upon;

Fig. 3 is a cross-sectional view taken along a vertical plane passing through line 3—3 of Fig. 2 and showing further details of the liquefier and its operating parts;

Fig. 4 is a side elevational view of a modified form of heating table utilizing steam as the heating fluid;

Figs. 5 and 6 are respectively a top plan view and a side elevational view of a further modified form of table in which the table is heated electrically; and Fig. 7 is a side elevational view, partly in section, somewhat diagrammatically showing a modified form of liquefier utilizing the modified form of table shown in Figs. 5 and 6.

Referring to the drawings and more particularly to Figs. 1, 2 and 3: a liquefying table is designated in general as 1. The table in the present embodiment is of general disk-like shape and is comprised (Fig. 3) of a top plate 2 and a bottom plate 3 joined together along peripheral edges 4—5 in spaced apart relationship and reinforced by a plurality of connecting studs, such as 6 and 7 extending between the plates 2 and 3, so as to provide a fluid-tight chamber for receiving a heating medium, such as steam. The disk-like table 1 is mounted on the upper end of a pipe 8 which is rotatably supported by ball-bearing pillow blocks 9 and 10. A pipe 11 is axially disposed within the pipe 8 and is fixed thereto for rotation therewith. The pipe 8 serves as a driving shaft for the table 1 and is driven by an electrical motor 12 to the shaft of which is secured a chain sprocket 13 in driving engagement with a chain 14 which is in driving engagement with a cooperating sprocket 15 secured to the pipe shaft 8. The motor 12 and pillow blocks 9 and 10 are supported by steel plates 21 and 22, which are welded to cross pipes 23 and 24 which form a rigid part of a supporting frame designated in general as 25 which supports the entire liquefying unit. A collecting trough 26 is supported on the frame 25 by pipes, such as 27. A breast ring or peripheral wall 28 surrounds the table 1 in spaced relation to the periphery thereof and extends upwardly above and downwardly below said table and is held in position on the frame 25 by means of collars, such as 29 and 30, secured to the wall 28 and engaging corresponding tubular upright supports provided on the frame 25 and held in vertical position thereon by means of rings, such as 31 and 32. A stationary stop plate or baffle 33 is disposed within the wall 28 and extends in a direction radially of the table 1. The plate 33 is rigidly held in position by lugs 40, 41 and 42 rigidly secured to the interior of wall 28 to provide spaced portions between which the outer edge of plate 33 is slidably disposed and by a ring 34' rigidly secured to the lower inner end of plate 33 and slidably engaged over a supporting pin 34 which is welded to the center of table 1 in general alignment with the upper end of pipe 11. The plate 33 is supported so as to be slightly spaced above the top surface of the table 1 and extends from adjacent the axial center outwardly to the periphery thereof, for the purposes to be more fully described below.

A stuffing box 43 is supported on a plate 44 which is rigidly secured to the supporting plates 21 and 22. The stuffing box 43 is in operative communication with the lower end of the rotatable pipe 11 and serves to introduce heating fluid, such as steam, into the pipe 11 for admission into the chamber provided in the table 1. A stuffing box 46 is rigidly secured to the supporting plate 22 and the rotatable pipe 8 passes therethrough in operative communication therewith and is closed at its lower end 45 in sealed relationship to the pipe 11. The upper end of pipe 11 is provided with a radially extending pipe 47 which terminates adjacent the axis of rotation of table 1 so that steam introduced into the inlet 11 enters the chamber in the table near the center and passes outwardly toward the periphery. As the steam condenses its builds up a meniscus, such as 48, on the peripheral wall of the chamber. This condensate is conducted to the outlet pipe 8 by means of a radially extending pipe 49 whose outer end is positioned in closely spaced relationship to the periphery of the chamber and whose inner end is secured to and in communication with the interior of pipe 8. The lower end of pipe 8 is in communication with the stuffing box outlet by means of a port, such as 50.

Referring more particularly to Figs. 1 and 2: an inclined loading trough or chute 51 is suitably supported on a frame designated in general as 52. The trough 51 is preferably provided with a jacketed bottom 53 for heating fluid, such as hot water or steam, which may be introduced through the inlet 54 and pass outwardly through the outlet 55. It is desired to heat the trough so that frozen or other solid or non-liquid material placed in the trough 51 will move down the incline easily and rapidly. The lower inner end of trough 51 (Figs. 1 and 2) extends through an opening 56 provided in the wall 28 closely adjacent the rear face of plate 33 and is so disposed that as the material to be melted, such as the frozen units or solid bodies S, S1, etc., is fed down the incline said material will move onto the upper horizontal surface of the table 1. Due to the rotation of table 1 (Fig. 2) in the direction of the arrow the units, such as S, S1, etc., will be carried around with the table and guided around the peripheral wall 28, which restrains them from movement in a radial direction under the influence of centrifugal force produced by the rotating table 1 until the units are successively brought to rest by the baffle plate 33 which serves to restrict their circumferential travel or by a preceding unit thus arrested.

*Operation*

In the preferred operation steam is introduced through the stuffing box 43 (Fig. 3), at the pressure required to provide the desired temperature and passes upwardly through pipe 11 and radially outwardly through pipe 47 and into the chamber of liquefying table 1, which table is being rotated by motor 12 so as to provide a centrifugal force to the material placed thereon. The non-liquid material solid units S are placed on the upper surface of the table 1 and thereby are successively quickly carried around with the table until they are arrested; the first by the stationary baffle plate 33 and each succeeding unit by the preceding one until the entire table is covered. During their limited circumferential movement and after the units are arrested they are restrained against radial movement by wall 28 until reduced to a liquid state.

The solid units melt progressively from their bottoms upwardly and the resultant liquid is forcibly discharged as the melting progresses; the first unit of the series being first to melt and the succeeding units progressively moving against the plate 33 in succession. This feature results in the highly beneficial advantages, (1) the liquid is removed immediately and continuously from the melting zone and thereby prevents deleterious action which would be caused if the liquid were subjected to heat for too long a period; and (2) successive portions of the heated surface are brought into direct contact with the bottom of the non-liquid mass of material to be liquefied. The shearing action of the rotating surface facilitates the removal of the liquid or semi-liquid increments of material and thus aids the steps of melting and discharging. The liquid material which is forcibly discharged from the upper surface of table 1 is thrown against the peripheral wall 28 and flows downwardly to the lower edge thereof and thence into the collecting trough 26 from which the liquid material passes outwardly through an outlet 57 disposed in the lower portion of said trough.

As the steam passes outwardly from pipe 47 (Fig. 3) and transfers its heat to the table 1 it condenses and is thrown outwardly by centrifugal force to the periphery of the chamber where it forms a ring 48 and from this point the condensate passes inwardly through pipe 49, downwardly through pipe 8 and outwardly through port 50 and stuffing box 46. The pressure of the steam entering stuffing box 43 is sufficiently greater than the pressure in the stuffing box 46 so as to overcome the centrifugal force exerted by the rotating table 1, thereby to assure the return of the condensate through the discharge and outwardly through stuffing box 46. A condensate pump (not shown) may be used in case the initial steam pressure is such as not to furnish the required pressure on the condensate to remove it.

The breast ring or peripheral wall 28 and the collecting trough 26 may be jacketed (not shown) so as to provide for heating or cooling the product in its path of discharge.

*Modifications*

Referring to Fig. 4: a modification of the liquefying table is shown in which the table is designated as 101 and comprises a top plate 102 and a lower plate 103 joined together at their peripheral edges 104—105 and reinforced by studs, such as 106 and 107, in a manner similar to that previously described with reference to the embodiment of Figs. 1, 2 and 3. Similarly, the table is mounted on tube 108 within which is disposed a tube 111 which functions in the manner heretofore described for introducing steam into the chamber formed in the table and conveying the condensate therefrom. In this embodiment the top plate 102 of the table is provided with concentric corrugations C to provide additional heating surface for a given diameter.

Figs. 5 and 6 illustrate a modified liquefying table. The table is designated in general as 200 and comprises an upper plate 201 and a lower plate 202 and an intermediate electrical heating element 203. The upper plate 201 is preferably made of stainless steel and is provided with depressed channels, such as 204, extending radially outwardly from a central recess 205, thereby providing discharge passages for the liquefied material as it is thrown outwardly by centrifugal force. The table 200 is mounted on a shaft 206. Electrical current is supplied to the element 203 through wires 207—208 connected to a suitable source of current and having a running connection with the rotating shaft 206.

In Figure 7 there is shown somewhat diagrammatically a liquefier adapted for handling a single piece of material to be liquefied. In this embodiment the liquefying table 200 is utilized and its shaft 206 is rotatably mounted in and supported by suitable pillow blocks 209—210 rigidly supported on the frame designated in general as 211. The shaft and table are driven by electrical motor 212 through a sprocket 213 mounted on the motor shaft, a chain 214 in driven engagement therewith and in turn in driving engagement with a sprocket 215 mounted on the shaft 206. A peripheral wall 216 is supported from the frame 211 and is disposed with respect to the table 200 in the manner substantially as heretofore described with respect to the embodiment of Figs. 1, 2 and 3. An inclined collecting pan or trough 217 is disposed below the peripheral wall 216 to catch the liquid passing downwardly thereof and the liquid flows down the inclined pan 217 and out at 217'. A single knife type member 218 is fixed to the lower end of the supporting shaft 219 slidably disposed in a cross bar 220 rigidly mounted on the frame 211 and is provided at its upper end with a pin 221. A single frozen unit or other solid material M is placed on the table 200 and the knife-like member 218 moves downwardly by gravity to prevent the rotation of material M with the table 200. As the material melts progressively from its bottom upwardly the knife edge follows the material downwardly until the material is melted, at which time the pin 221 restrains the knife edge 218 from engagement with the rotating table 200. As in the previous embodiment, the melted material is continuously forcibly discharged from the rotating table while the unmelted or solid material is retained in melting position.

The invention provides great flexibility in the liquefying of many products due to the fact that by varying the speed of the liquefying table, varying the pressure of the steam (or electric input) and by the use of scrapers (not shown) on the rotating table many different results may be obtained.

The following control units which are or may be used advantageously in the apparatus herein described are omitted from the drawings for purposes of simplicity and since such units per se are well known to those skilled in the art. In using steam for heat it is customary to use a pressure reduction valve. A pressurestat is installed in the steam line so that if the steam pressure falls below a predetermined point the motor will be shut off. This prevents the products being liquefied from seizing to the table and causing damage. The pressure valve may be automatically controlled by the temperature of the melted product to vary the steam pressure. A rheostat may be similarly controlled by the temperature of the melted product to vary the electric current input to the electrical heating elements of the embodiment shown in Figs. 6 and 7. The speed of the rotating table may also be automatically controlled by the temperature of the melted product. Where more than one product is to be melted it is customary to provide an expansion valve for each product. A safety valve and a safety rupture disk are installed in the steam feed line.

Having thus described my invention with particularity with reference to the preferred method of carrying out the same and in connection with the present preferred apparatus for carrying out the same and having referred to certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim is:

1. Apparatus for melting a substantially solid mass, comprising a frame, an upright annular wall supported on said frame and fixed against rotation, a rotatable table disposed horizontally within the wall intermediate its upper and lower edges and in spaced relationship thereto for receiving a mass to be melted, motive means for rotating said table, means for heating said table, and means disposed above and fixed against rotation with said table and cooperating with an adjacent portion of said fixed wall to jointly restrict said mass against rotation with said table and against outward movement from said table while said mass is supported thereon in position for melting.

2. Apparatus for melting a solid mass of material, comprising a supporting frame, an annular wall supported on said frame and fixed against rotation, a table mounted on said frame for rotation about a generally vertical axis and having a top disposed horizontally within said wall with its peripheral margin adjacent the lower edge of the wall in spaced relationship thereto for receiving said material to be melted, motive means for rotating said table to thereby create a centrifugal force sufficient to expel melted material therefrom, means for heating said table, and means disposed above and fixed against rotation with said table and cooperating with an adjacent portion of said fixed wall to jointly restrict said mass against rotation with said table and against outward radial movement due to centrifugal force while said mass is supported thereon in position for melting, and means for collecting and discharging the resultant liquid expelled from the table by said centrifugal force.

3. Mechanism for melting units of frozen or solid products, comprising a rotatable table for supporting a number of said units, a wall surrounding said table and projecting above the same for retaining the units supported on said table, a barrier plate connected to said wall and extending to approximately the center of said table an adjacent portion of said wall being disposed in cooperative relationship with said barrier plate for stopping the movement of said units while supported on said table, means for rotating said table, means for heating said table and for progressively melting the units thereon as said table is rotated, and a collecting trough mounted below said table in register with the lower edge of said wall and provided with means for discharging liquid from said trough.

4. Mechanism for melting units of frozen or solid products, comprising a rotatable table having a chamber therein for heating fluid and an upper surface in heat transfer contiguity with said chamber for supporting a number of frozen food units, a wall surrounding said table and projecting above said upper surface for retaining the frozen units supported on said table, a barrier plate connected to said wall and extending to approximately the center of said table for stopping the movement of units while supported on said table, means for rotating said table, means for supplying heating fluid to said chamber and said table for progressively melting the units thereon as said table is rotated, and a collecting trough mounted below said table and in register with the lower edge of said wall, said wall having an opening in one side, and a loading platform leading to said opening for inserting frozen units through said wall and onto said table.

5. Mechanism for melting units of frozen or solid products, comprising a rotatable table for supporting a number of said units, a wall surrounding said table and projecting above the same for retaining said units supported on said table, a barrier plate connected to said wall and extending to approximately the center of said table for stopping the movement of said units while supported on said table, means for rotating said table, an electrical heating element carried by said table, means for supplying electric current to said heating element for heating said table for progressively melting the units on the table as the same is rotated, and a collecting trough mounted below said table and in register with the lower edge of said wall.

6. Apparatus for liquefying frozen food, comprising a rotatable table having a heating chamber therein, means for supplying steam into said chamber for heating said table, means for removing condensed steam from said chamber, a container wall surrounding all but a part of said table to provide a feed opening through said wall, means for guiding said frozen food to be liquefied through said wall opening to said table, a support at the center of said table, a barrier plate detachably mounted at its inner end on said support and connected at its outer end to said wall adjacent one side of said wall opening, means for rotating said table in a direction to move the portion of said table opposite said wall opening away from the rear face of said plate, whereby said frozen food is carried by said table from the feed opening at the rear of said plate around to the front of said plate where further movement is arrested, to thereby progressively bring successive portions of said table into heat transfer relationship with said frozen food to liquefy the same and to forcefully discharge the resultant liquid off the table by centrifugal force generated by its rotation, and a trough arranged beneath said wall and the periphery of the table for collecting the liquid thrown outwardly by said centrifugal force.

7. The method of melting a non-liquid food unit which comprises, supporting said frozen unit with its lower end disposed on a heated surface, applying successive portions of said heated surface progressively to the lower end of said unit while supported on said surface and restricted against movement in a direction parallel to said surface and thereby progressively melting the unit from bottom to top, moving said heated surface about an axis of rotation to thereby subject the unit and progressively melted material to centrifugal force, and restraining said unit against said centrifugal force while providing a path of escape for said melted material to be immediately forcefully discharged from the lower end of said unit.

8. The method of melting non-liquid units consisting of heating a table disposed within an enclosure, rotating said table, feeding a number of said units onto the rotating heated table in succession in backed-up relationship, holding the said units against movement with the table so as to present a changing heating area of the table to the bottoms of the respective units whereby the bottom surfaces of the units are removed by melting and by a shearing action, and removing the melted food product from the table by the centrifugal action of said rotating table.

9. A liquefier, comprising a rotatable table for supporting a substance to be liquefied, means for heating said table, means for rotating said table to thereby produce a centrifugal force, a relatively fixed baffle positioned above said table and extending upwardly from adjacent its upper surface and in a generally radial direction from adjacent the center to adjacent the peripheral margin of said table to thereby restrict the circumferential movement of said substance to be liquefied while supported on said table, a peripheral wall surrounding said table in spaced relation to the periphery thereof and extending upwardly above and downwardly below said table, said upwardly extending wall portion being provided with an opening on the rear side of said baffle for the introduction of said substance onto a segment of said table moving away from said baffle in the direction of rotation of said table, whereby said substance while supported on said table is restrained by said wall against radial movement and guided circumferentially toward and against the opposite or front side of said restricting baffle, and means for collecting the liquefied material which is ejected by said centrifugal force and thrown against said peripheral wall.

10. In apparatus of the character described, the combination of a substantially horizontal centrifugal table mounted for rotation about a substantially vertical axis and comprising a substantially circular chamber for receiving a fluid heating medium, fluid inlet conduit means in communication with said chamber adjacent the axial center of said chamber for introducing said fluid into said chamber, fluid outlet conduit means in communication with said chamber adjacent the periphery of said chamber for conducting fluid out of said chamber, means operable during rotation of said table for supplying heating fluid into said chamber and for forcing residual fluid out of said chamber against the centrifugal force created by the rotation of said table, means for rotating said table, and relatively fixed restraining means spaced from said table and disposed peripherally and radially thereof, to thereby restrain non-liquid material disposed on said table against movement while permitting the melted material to be discharged.

11. The method of liquefying a non-liquid product which comprises, supporting said non-liquid product on a rotating heated surface, restraining the non-liquid constituent of said product against movement with said heated surface to thereby provide relative movement between said surface and said non-liquid product being liquefied thereon, forcibly discharging the resultant liquid increments of said product continuously away from the bottom of the non-liquid constituent under the influence of centrifugal force produced by said rotating surface, and collecting said discharged liquid.

12. The method of liquefying substantially solid units of a substance which comprises, progressively feeding a series of said units in a substantially horizontal plane coincident with their lower ends and in a substantially circular path about a common center while subjecting them to combined circumferential and radial forces around and outwardly from said center, restraining said units against radial movement and restricting their circumferential movement, applying heat in a zone coinciding with said plane disposed at the lower ends of said units to thereby liquefy them progessively from their lower ends upwardly, and continuously forcefully removing the resultant liquid constituent from the lower ends of said units as they are progressively liquefied, whereby the liquid constituent is immediately removed from the heat zone and the solid constituent is maintained in direct heat transfer relationship.

References Cited in the file of this patent

UNITED STATES PATENTS

| | | |
|---|---|---|
| 950,895 | Cuntz | Mar. 1, 1910 |
| 1,460,024 | Lowenstein | June 26, 1923 |
| 1,684,710 | Methfessel | Sept. 18, 1928 |
| 1,751,713 | Pellerin | Mar. 25, 1930 |
| 1,940,353 | Jenkins | Dec. 19, 1933 |
| 1,993,973 | McNeil | Mar. 12, 1935 |
| 2,133,319 | Davis | Oct. 18, 1938 |
| 2,205,431 | Olson | June 25, 1940 |
| 2,467,659 | Cayas | Apr. 19, 1949 |
| 2,472,594 | Kuehn et al. | June 7, 1949 |